June 2, 1925.

R. A. FOLSOM

HUMIDITY CONTROL APPARATUS

Filed Dec. 13, 1920     2 Sheets-Sheet 1

1,540,322

Inventor:
Rolfe A. Folsom.
by Hubert A. Allison
Att'y.

June 2, 1925.

R. A. FOLSOM 1,540,322

HUMIDITY CONTROL APPARATUS

Filed Dec. 13, 1920     2 Sheets-Sheet 2

Inventor:
Rolfe A. Folsom,
by Hubert A. Pattison.
Atty.

Patented June 2, 1925.

1,540,322

UNITED STATES PATENT OFFICE.

ROLFE A. FOLSOM, OF LEONIA, NEW JERSEY, ASSIGNOR TO WESTERN ELECTRIC COMPANY, INCORPORATED, OF NEW YORK, N. Y., A CORPORATION OF NEW YORK.

HUMIDITY-CONTROL APPARATUS.

Application filed December 13, 1920. Serial No. 430,425.

*To all whom it may concern:*

Be it known that I, ROLFE A. FOLSOM, a citizen of the United States, residing at Leonia, in the county of Bergen, State of New Jersey, have invented certain new and useful Improvements in Humidity-Control Apparatus, of which the following is a full, clear, concise, and exact description.

This invention relates to improvements in humidity control apparatus and more particularly to such apparatus which depends for its operation upon change in vapor pressure of a volatile liquid with temperature.

An object of the invention is to provide a humidity control apparatus with means for interpreting electrically the changes in vapor pressure of a volatile liquid.

Another object of the present improvement is to so design a humidity control apparatus that the change in pressure of a volatile liquid controls electric circuits containing translating devices which regulate humidity producing and reducing mechanism.

A further object of the present improvement is to produce a humidity control apparatus dependent for its operation upon change in vapor pressure of a volatile liquid which may be adjusted for any desired humidity and provided with means for interpreting electrically the changes in vapor pressure of the said liquid to automatically regulate humidity producing and reducing mechanism to keep the humidity at the adjusted point.

Other objects and advantages of the invention will be set forth in detail in the following specification and particularly pointed out in the appended claims.

Figure 1:
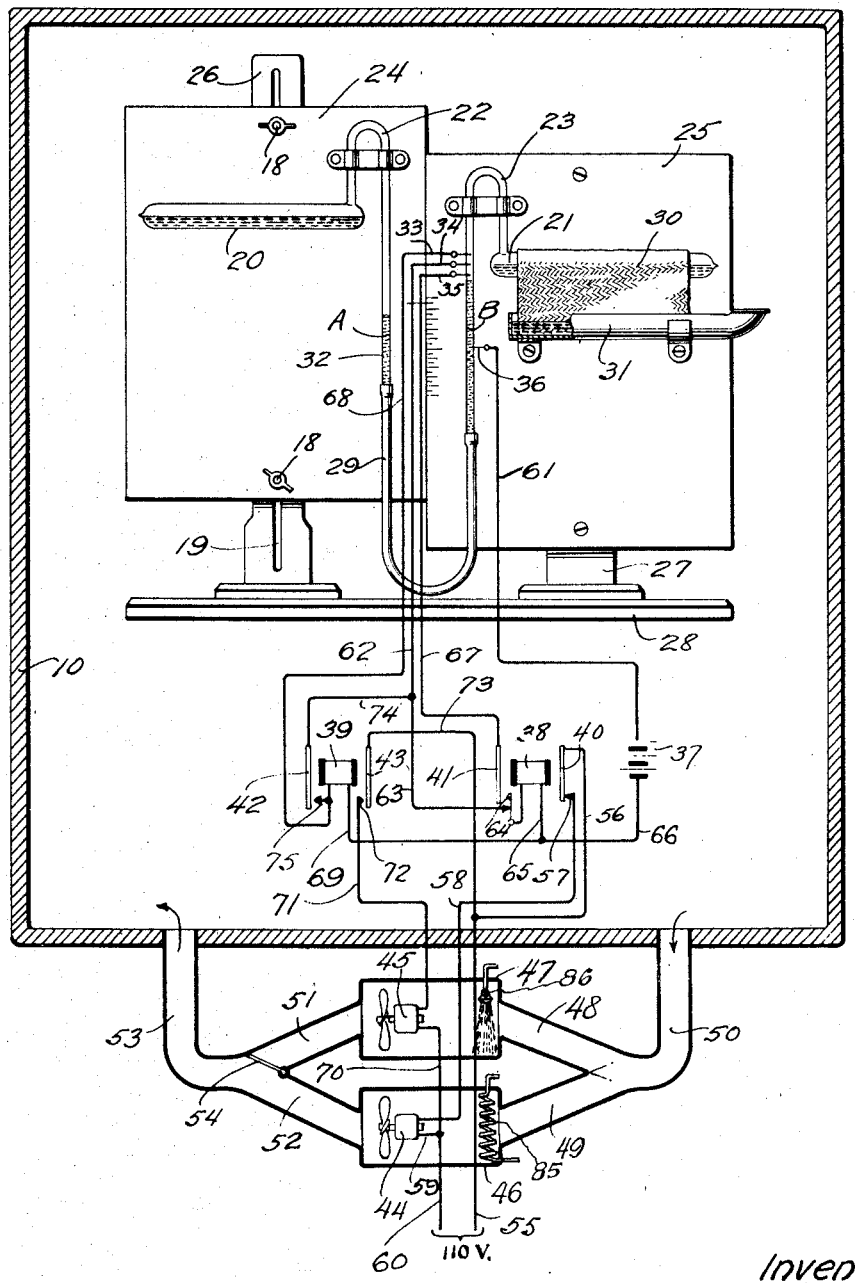

In the accompanying drawings Fig. 1 is a diagrammatic illustration of a humidity control apparatus and embodying a schematic illustration of an electric circuit containing translating devices for interpreting the operation of the humidity control apparatus.

Figure 2:
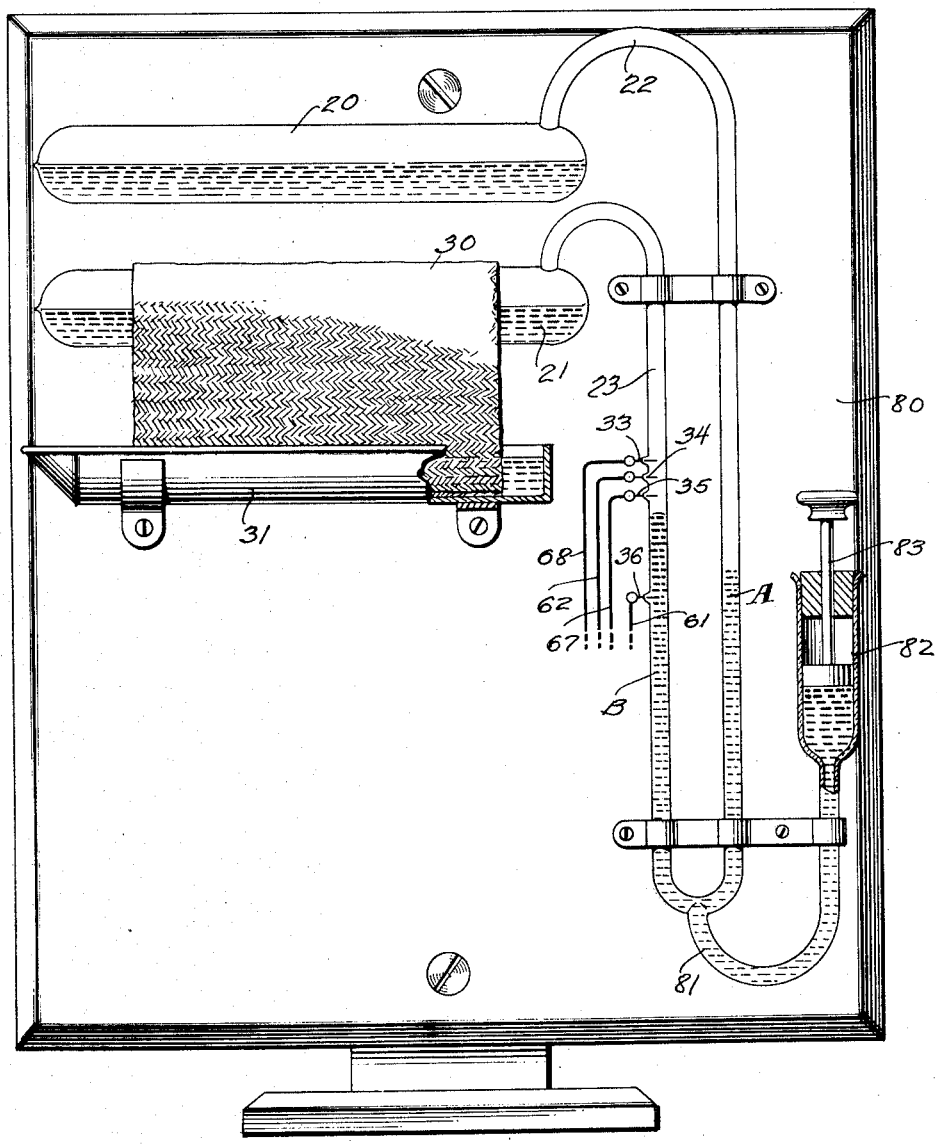

Fig. 2 is a diagrammatic view showing a modification of the humidity control apparatus shown in Fig. 1, the modification residing particularly in the means for adjusting the apparatus to keep the humidity at any desired point.

Referring now to the drawings in which like reference numerals designate similar parts throughout the several views, the humidity control apparatus is shown in Fig. 1 as mounted within a room or other enclosure 10.

The humidity control apparatus itself comprises two glass bulbs 20 and 21 to which are secured U-shaped glass tubes 22 and 23 which have their longer legs disposed in a vertical position. The bulbs 20 and 21 are suitably mounted upon easels 24 and 25, or other suitable supporting means, which are attached to vertical uprights 26 and 27, respectively, secured to a base 28.

The easel 25 is rigidly secured to the standard 27, while the standard 26 is provided with a vertical slot 19 receiving bolts 18 carried by the easel 24 which permits a vertical adjustment of the said easel for purposes hereafter to be explained in detail. A flexible tube 29 of rubber or other suitable material has its ends attached to the vertical depending legs of the U-tubes 22 and 23. The bulb 20 is a "dry" bulb, while the bulb 21 is kept "wet" by means of absorbing material 30 which rests thereupon and projects into a tank 31 containing water, the absorbing material 30 being kept moist by capillary attraction. A sufficient quantity of mercury 32 is placed in the depending legs of the tubes 22 and 23 and the rubber tube 29 to form two mercury columns A and B as shown. Each of the bulbs 20 and 21 is partially filled with a suitable volatile liquid and the said bulbs together with the portions of the tubes 22 and 23 above the mercury columns A and B are freed of all gases, so that the spaces between the levels of the volatile liquid within the bulbs and the tops of the mercury columns are completely filled with gas evaporated from the volatile liquid.

The humidity control apparatus above described is adapted to keep the humidity within the room or enclosure 10 at any desired point for any predetermined but constant temperature. Any suitable means (not shown) is employed for keeping the temperature within the room or enclosure 10 constant at any desired degree. At any humidity (except at the point of complete saturation) the bulb 21, due to the evaporation of water from the absorbing material 30, will always be cooler than the dry bulb 20; and the pressure of the volatile liquid within the bulb 21 will be less than that within the bulb 20, so that the mercury columns A and B will at all times be out of balance, approaching a balance as a saturation point is approached. In other words, the mercury column B is raised commensurate with the increase and decrease of vapor pressure of the volatile liquid within the bulbs 20 and 21 respectively, the column lowering as the humidity increases and rising as the humidity decreases. This action, as is readily understood, is due to the fact that at low humidity the evaporation of the water in the absorbing material 30 will be rapid, resulting in a cooling of the bulb 21 and a reduction of the pressure of the volatile liquid therein. A reduction of the pressure within the bulb 21 permits the column B to rise, being pushed upwardly by relatively greater pressure within the bulb 20 which is exerted against the column of mercury A. At high humidity, however, the evaporation of water from the absorbing material 30 will be slow, so that the bulb 21 will not be much cooler than the bulb 20. As a consequence, the increased pressure in the bulb 21 will more nearly equal the pressure in the bulb 20 and cause a lowering of the mercury column B so that this colum and the column A will approach the same level.

The movements of the column B are interpreted electrically to control apparatus for increasing or decreasing humidity so that the humidity in the enclosure 10 will be kept substantially constant.

To this end, three electrical contacts 33, 34 and 35 are imbedded in the longer leg of the tube 23 at spaced points thereon and are adapted to come in contact with the mercury in the column B. A fourth electrical contact 36 is imbedded in the longer leg of the tube 23 at a point considerably below contacts 33, 34 and 35, which is adapted at all times to come in contact with the mercury in column B.

These four contacts are connected in circuit by suitable conductors, hereafter to be described, with a source of electrical energy such as a battery 37 and relays 38 and 39, the former having armatures 40, 41 while the latter is provided with armatures 42, 43. The armatures of these relays when actuated are adapted to make or break operating circuits for controlling apparatus for increasing or decreasing humidity. Any suitable apparatus may be employed for this purpose and in the embodiment herein disclosed the armatures of the relays 38 and 39 make or break operating circuits for motor driven fans 44 and 45. These fans are located within suitable enclosures 46 and 47, the former containing a cold water radiator 85 or other means for drying air as it is passed therethrough by the actuation of the motor driven fan 44, and the latter containing a water spray 86 or other means for moistening the air as it is passed through the enclosure by the actuation of the motor driven fan 45. The cold water radiator 85 may be an iron or copper pipe coil through which water flows, the water having a temperature considerably below the temperature of the air coming in contact with the coil. Some of the moisture in the air will then condense on this cold coil and so be removed from the air. One end of the enclosures 46 and 47 is connected with pipes 48 and 49 which join with a common pipe 50 in communication with the enclosure 10. The other ends of the enclosures 46 and 47 are in communication with pipes 51 and 52 which are both joined to a pipe 53 which is in communication with the enclosure 10. A flap valve 54 mounted at the junction of pipes 51 and 52 with the pipe 53 is adapted to close the pipes 51 and 52 alternately, depending upon which of the fan motors 44 and 45 is operating.

With the parts in the positions shown in Fig. 1, both relays 38 and 39 are deenergized so that their respective armatures are in their normal positions. At this time the humidity within the enclosure 10 is high and the fan motor 44 is in operation to circulate the air within the enclosure through the chamber 46 for drying it. The fan motor 44 is supplied from any suitable source of current, such a source being illustrated, as the usual commercial supply of 110 volts. The fan motor 44 is supplied with current over the following path: from the source of supply, through conductor 55, conductor 56, armature 40 of relay 38, back contact 57 of said relay, conductor 58, fan motor 44, conductor 59 and conductor 60 leading back to the source of current supply. Attention is called to the fact that at this time the humidity within the enclosure 10 is such that the pressure of the volatile liquid within the bulbs 20 and 21 positions the mercury column B below the contacts 33, 34 and 35.

When by the actuation of the fan motor 44, the humidity within the enclosure 10 is reduced to a point to cause the mercury column B to engage the terminals 34 and 35, a circuit will be closed to energize the relay 38 so that it will attract its armature 40 and break at the contact 57 the circuit for the fan motor 44.

The circuit for energizing the relay 38 is as follows: from one side of battery 37 through conductor 61, contact 36, mercury column B, contact 34, conductors 62 and 63, make-before-break contact 64, winding of relay 38, conductors 65 and 66 back to the other side of battery 37. The energization of the relay 38, in addition to breaking the circuit for the fan motor 44, establishes a holding circuit for itself by the engagement of its armature 41 with the make-before-break contact 64 over the following circuit: from one side of battery 37, conductor 61 and contact 36, mercury column B, contact 35, conductor 67, armature 41, make-before-break contact 64, winding of relay 38, conductors 65 and 66 back to the other side of battery 37. As previously stated when the relay 38 is energized, the circuit for the fan motor 44 is broken and the process of dehumidifying the air within the enclosure 10 is stopped.

Should the humidity in the said enclosure be reduced to a point to cause the mercury column B, under the action of the volatile liquid within the bulbs 20 and 21, to rise to a point sufficient to engage with the contact 33, relay 39 will be energized which will close a circuit for supplying current from the 110 volt source to the fan motor 45 which serves to circulate air within the enclosure 10 through the chamber 47 to moisten it. The relay 39 is energized over the following circuit: from one side of battery 37, conductor 61, contact 36, mercury column B, contact 33, conductor 68, winding of relay 39, conductors 69 and 66, back to the other side of battery 37. The energization of the relay 39 attracts its armatures 42 and 43, the attraction of the latter closing a circuit for the fan motor 45 which is as follows: from the source of supply through conductors 60, 70, fan motor 45, conductor 71, front contact 72 of relay 39, armature 43, conductors 73 and 55, back to the source of supply. The relay 39 in pulling up its armature 42 establishes a holding circuit for itself which is as follows: from one side of battery 37, conductors 61, contact 36, mercury column B, contact 34, conductors 62, 74, armature 42, back contact 75, winding of relay 39, conductors 69 and 66 back to the other side of battery 37. While the relay 39 is energized, as previously explained, the fan motor 45 will operate which serves to increase the humidity within the enclosure 10.

When the humidity within the said enclosure is increased sufficiently to cause the mercury column B to descend until it clears the contact 33, the energizing circuit of the relay 39 will be broken, but this relay will remain energized over its holding circuit which includes contact 34 until the mercury descends below the said contact, at which time the holding circuit for the relay 39 will be broken causing it to deenergize which in releasing its armature 43 breaks the circuit for the fan motor 45. When the mercury column B passes out of engagement with the contacts 33 and 34, the relay 39 is deenergized keeping the circuit for the fan motor 45 open, while the relay 38 is energized keeping the circuit for the fan motor 44 open. When, however, the mercury column descends below the contact 35, the relay 38 will be deenergized which in releasing its armature 40 establishes a circuit for the fan motor 44 over the circuit previously described.

From the above description it will be seen that with the bulbs 20 and 21 occupying the positions shown in Fig. 1, the humidity within the enclosure 10 will be kept automatically at a predetermined point due to movements of the mercury column B, which through the electric circuits and apparatus described serves to either reduce or increase the humidity to keep it at the desired predetermined point. Means is provided for adjusting the humidity controlling apparatus so that the air within the enclosure 10 may be kept at any desired humidity. This means consists in raising or lowering the easel 24 through its bolt and slot connection with the standard 26. The raising or lowering of the bulb 20 will cause a corresponding raising or a lowering of the mercury column B which will cause the air within the enclosure 10 to have a greater or less humidity than the humidity produced when the bulb 20 is in the position illustrated in Fig. 1.

In the modification shown in Fig. 2, the bulbs 20 and 21 are mounted upon a single easel 80, instead of upon separate easels as in the construction shown in Fig. 1. Different means, however, is provided for adjusting the apparatus to keep the humidity at a desired point. In this construction the U-tubes 22 and 23 are joined to a common tube 81 which communicates with a plunger pump 82 containing a plunger 83. A depression of the plunger 83 will serve to raise the mercury columns A and B, while a lifting of the plunger will cause a lowering of said columns. The electric circuits and the apparatus for increasing and decreasing the humidity are the same as is shown in Fig. 1.

What is claimed is:

1. In combination; an air filled enclosure; means for adding moisture to the air in said enclosure; means for extracting moisture from the air in said enclosure; and a humidostat for controlling each of said means, said humidostat being actuated by the increase in vapor pressure of a volatile liquid.

2. In combination; an air filled enclosure; means for adding moisture to the air in said enclosure; means for extracting moisture from the air in said enclosure; and a humidostat for controlling each of said means, said humidostat being actuated by the increase in vapor pressure of a volatile liquid and comprising electric translating means for interpreting the expansion of said volatile liquid.

3. In combination; an air filled enclosure; means for adding moisture to the air in said enclosure; means for extracting moisture from the air in said enclosure; and a humidostat for controlling each of said means, said humidostat comprising a volatile liquid and a mercury column controlled by the change in the vapor pressure of the volatile liquid; and electric translating means for interpreting the movements of said mercury column.

4. In combination; an air filled enclosure; means for adding moisture to the air in said enclosure; means for extracting moisture from the air in said enclosure; and a humidostat actuated by the change in vapor pressure of a volatile liquid and arranged to control each of said means, whereby both of said means are kept dormant or either of said means is caused to function.

5. A humidity control apparatus comprising a wet and a dry bulb each containing a volatile liquid, a mercury column moved by the change in the vapor pressure of the volatile liquid within the said bulbs, electric translating devices for interpreting the movements of the said mercury column, and humidity producing and reducing mechanism controlled by said electric translating devices.

6. A humidity control apparatus comprising a wet bulb and a dry bulb connected to each other and each containing a volatile liquid, a mercury column in the connection between the said bulbs, a plurality of electrical contacts adapted to make connection with the said mercury column, an electrical contact in constant connection with the said mercury column, electrical translating devices in circuit connection with all of the said contacts, and humidity producing and reducing apparatus controlled by said translating devices.

7. A humidity control apparatus comprising a wet bulb and a dry bulb connected to each other and each containing a volatile liquid, a mercury column in the connection between the said bulbs, a plurality of electrical contacts adapted to make connection with the said mercury column, an electrical contact in constant connection with the said mercury column, a plurality of relays in circuit connection with all of said contacts and humidity producing and reducing apparatus controlled by said relays.

8. A humidity control apparatus comprising a wet bulb and a dry bulb connected to each other and each containing a volatile liquid, a mercury column in the connection between the said bulbs, a plurality of spaced electrical contacts adapted to make connection with the said mercury column, a relay energized when the said mercury column makes connection with one of said contacts, another relay energized when the said mercury column makes connection with another of said contacts, and humidity producing and reducing apparatus controlled by said relays.

9. A humidity control apparatus comprising a wet bulb and a dry bulb connected to each other and each containing a volatile liquid, a mercury column in the connection between the said bulbs, a plurality of spaced electrical contacts adapted to make connection with the said mercury column, a relay energized when the said mercury column makes connection with one of said contacts, another relay energized when the said mercury column makes connection with another of said contacts, humidity producing and reducing apparatus, the energization of one of said relays stopping the operation of the humidity reducing apparatus and the energization of the other relay starting the operation of the humidity producing apparatus.

10. In a humidity control device comprising a wet and dry bulb humidostat responsive to the change in vapor pressure of a volatile liquid with change in temperature, an electrical circuit having means therein for effecting humidity control, said means comprising electrical contacts connected to said humidostat, relays, and humidity producing and reducing apparatus, said electrical contacts causing the operation of said relays through the medium of said humidostat to effect the operation of said humidity producing and reducing apparatus.

In witness whereof, I hereunto subscribe my name this 8th day of December, A. D., 1920.

ROLFE A. FOLSOM.